July 18, 1950 C. VOLZ 2,515,916

CODED CARRIER SIGNALING APPARATUS AMPLIFIER

Filed Oct. 29, 1947

INVENTOR.
Carl Volz.
BY
HIS ATTORNEY

Patented July 18, 1950 | 2,515,916

UNITED STATES PATENT OFFICE 2,515,916

CODED CARRIER SIGNALING APPARATUS AMPLIFIER

Carl Volz, Pittsburgh, Pa., assignor to The Union Switch & Signal Company, Swissvale, Pa., a corporation of Pennsylvania Application October 29, 1947, Serial No. 782,805

11 Claims. (Cl. 179—171)

Figure 1:
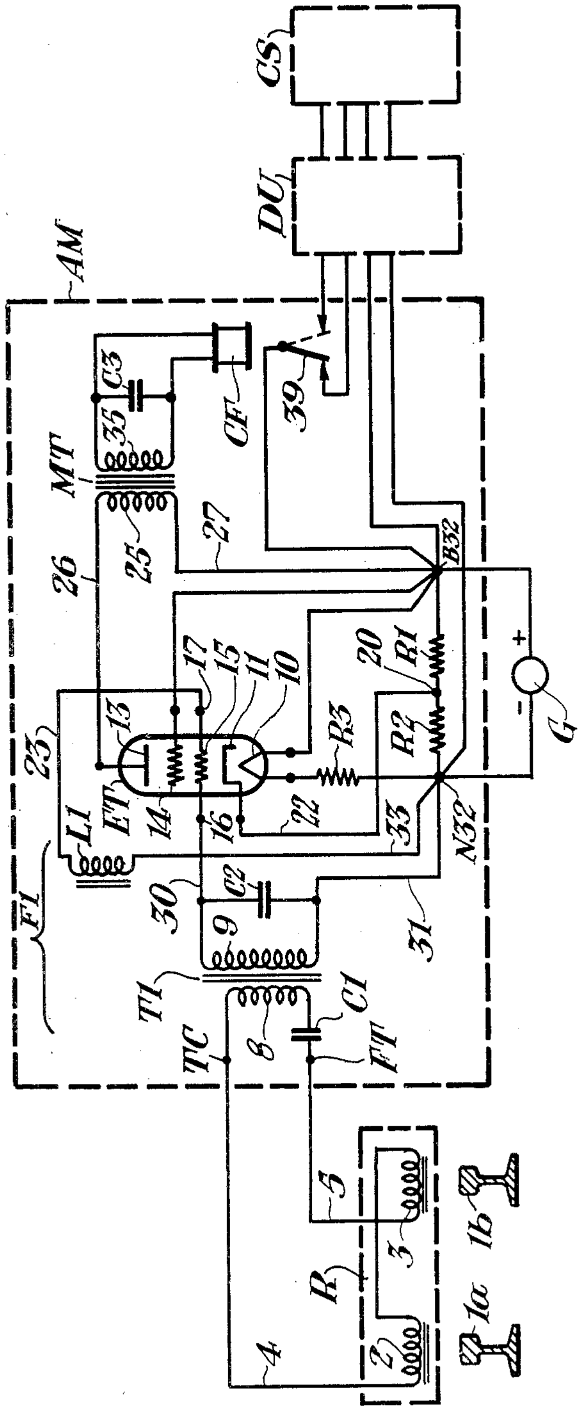

My invention relates to coded carrier signaling apparatus, and more particularly to an improved amplifier for use in a coded signaling system operated by carrier current.

The amplifier provided by this invention is adapted for use in train carried train control apparatus, such as is shown and described in Letters Patent of the United States No. 2,336,766, issued December 14, 1943 to Leslie R. Allison et al., but is not limited to such use.

Apparatus of the type shown in that patent uses a trackway circuit including the track rails to which circuit is supplied alternating current coded by being periodically interrupted at any one of several different code rates, a different code rate being assigned to each of several different traffic conditions. Energy is transferred from such track circuit to a train carried receiver mounted on a train in inductive relation to the rails, an electromotive force of the frequency and code of the rail current being thus induced in the receiver. The received electromotive force is used to operate a train carried code following relay which in turn governs train controlling devices through decoding means which is selectively responsive to the code rate at which the relay is operated. The received electromotive force is of a relatively low energy level and an amplifier is interposed between the receiver and the code following relay. The requirements of such an amplifier are exacting because safety of operation must be as nearly one hundred per cent as can be reasonably obtained.

In arrangements of equipment of this type, an intermittent open connection in the grid circuit of the electron tube used in the amplifier might result in improper operation of the equipment. For example, should the grid circuit of the amplifier tube employed in connection with equipment of the type here involved become open, thereby removing the grid bias voltage, the value of the current in the plate circuit of the amplifier may increase to such a point that sufficient energy may be supplied to the code following relay to cause erroneous operation.

An object of my invention is to provide improved means of the type described for amplifying coded alternating current.

Another object of my invention is to provide improved means for amplifying coded alternating current, this means being constructed to eliminate false operation due to intermittent open circuit conditions.

Still another object of my invention is to provide novel means for checking the integrity of the grid of an electron tube.

Again, another object of my invention is to provide novel and improved means for checking the integrity of the grid circuit of an electron tube amplifier having an input filter tuned to pass a predetermined frequency.

A further object of my invention is to provide an amplifier responsive only to energy of a selected frequency supplied through a tuned filter, the equipment being arranged so that a portion of the inductance employed in the filter is connected in a circuit which includes the control grid of the amplifier tube in series therewith to thereby detune the filter and prevent supply of energy therethrough to the tube grid if the circuit of the tube grid is interrupted.

Another object of my invention is to provide an improved amplifier of the type described in which energy for establishing a bias on the control grid of the amplifier tube is supplied over two independent circuits each of which includes in series therewith an essential element of the filter through which energy is supplied to the tube grid.

In practicing my invention I provide an electron tube amplifier, the grid circuit having therein an input filter composed of capacitive elements and inductive elements arranged in the well-known manner of a parallel resonant circuit. The grid of the electron tube is constructed so that each of the two vertical supports of the grid structure is brought out to an external terminal of the tube, in such manner that a circuit may be arranged to have the grid and its terminals and internal connections in series therewith.

One of the elements of the tuned parallel resonant circuit is connected in series with the grid of the tube so that if any of the connections become open, or if the circuit of the grid of the tube becomes open, the circuit through this element will be interrupted and this element will be removed from the resonant circuit thereby detuning the input filter. The amplifier is arranged so that if the input filter is detuned, such as, for example, by the grid circuit becoming interrupted, the output of the amplifier will fall below the value necessary to operate the code following relay associated with the amplifier.

Additionally, this arrangement operates so that if one of the connections to the grid of the tube becomes open, bias voltage will continue to be applied to the grid of the tube through the other branch of the circuit, to thereby prevent the plate current from rising above its normal value.

Figure 2:
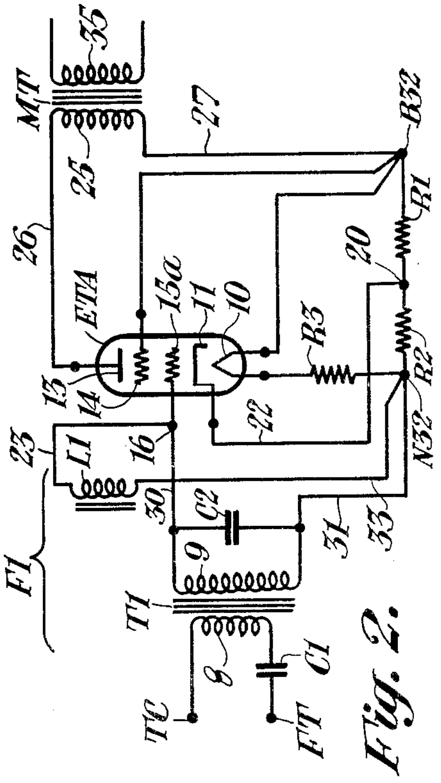

In the accompanying drawings, Fig. 1 is a diagrammatic view showing train carried train control apparatus using one form of a single stage amplifier unit embodying my invention, and Fig. 2 is a fragmentary view showing a modification of the arrangement shown in Fig. 1.

Similar reference characters refer to similar parts in each of the two views.

It is to be understood that my invention is not limited to train carried cab signal apparatus and this application illustrates the many places the apparatus is useful.

Referring to Fig. 1, the reference characters *1a* and *1b* designate the track rails of a stretch of railway. The rails of the track stretch are divided in the usual manner into track sections each of which is provided with a track circuit including the rails. An alternating current source is connected across the rails of the exit end of each section, the current from this source being coded at any one of a plurality of different code rates according to different traffic conditions. The trackway apparatus for supplying such coded current to rails *1a* and *1b* is not shown since it forms no part of my invention. It may be of any one of several well-known arrangements, such as, for example, that disclosed in Letters Patent of the United States, No. 1,986,679, granted January 1, 1935, to Lloyd V. Lewis, for Railway Traffic Controlling Apparatus.

In order to better understand my invention, the alternating current supplied to rails *1a* and *1b* will be considered as having a frequency of 100 cycles per second and as being coded at 180, 120 and 75 interruptions per minute to reflect "clear," "approach medium," and "approach" traffic conditions, respectively, and the absence of rail current reflects a "stop" or a slow speed traffic condition. It will be understood, however, that my invention is not limited to the above-mentioned frequency and code rates.

The train carried apparatus comprises a receiver R, an amplifying unit AM, a decoding unit DU, and a train controlling device or signaling means CS.

The receiver R includes two inductors 2 and 3 mounted on a train in inductive relation to rails *1a* and *1b*, respectively, whereby an alternating electromotive force is induced in each inductor 2 and 3 when alternating current flows in the rails. The windings of the two inductors are preferably connected to add the electromotive forces induced therein when current flows in opposite directions in the track rails at any given instant. It will be seen that with coded alternating current supplied to the track circuit including the rails *1a* and *1b*, an alternating electromotive force is received on the train through inductors 2 and 3, the electromotive force having a frequency and code rate corresponding to those of the rail current. Inductors 2 and 3 are connected by wires 4 and 5 to the input terminals TC and FT of the amplifier unit AM.

The amplifier unit AM comprises a filter F1, an electron tube ET, a master transformer MT, a code following relay CF, biasing resistors R1 and R2, condensers C1, C2, and C3 and the necessary circuit connections.

Filter F1 comprises condensers C1 and C2, and a transformer T1 having independent primary and secondary windings 8 and 9, respectively. The primary winding 8 of transformer T1 is connected in series with condenser C1 across the input terminals TC and FT, and condenser C2 is connected across the secondary winding 9 of the transformer T1. Additionally, filter F1 includes a reactor L1 which is connected across the secondary terminals of transformer T1 by a circuit including the control grid 15 of the electron tube ET. The filter F1 is tuned to resonance at the frequency of the track circuit current, which is here assumed to be 100 cycles per second. The coded alternating electromotive force received by inductors 2 and 3 due to track circuit current is passed by filter F1 with little attenuation, but electromotive forces picked up by the inductors due to extraneous currents of other frequencies are substantially suppressed.

Electron tube ET may be any one of several different types and is preferably a high vacuum indirectly heated cathode tube. As disclosed, electron tube ET has a filament or heater 10, a cathode 11, an anode or plate 13, a screen grid 14, and a control grid 15.

The electron tube ET is of conventional construction except that means is provided for establishing through the tube a circuit which includes the control grid 15 in series therewith. This may be accomplished by having the two vertically extending supporting wires on which the wire forming the control grid is mounted insulated from each other and having them extend to separate external terminals 16 and 17 in the base of the tube. This may also be accomplished by mounting the wire forming the control grid on insulating material and connecting the ends of this wire to separate external terminals in the base of the tube.

The tube ET is designed for operation on a single 32 volt source of direct current, it being contemplated that the usual train lighting generator will serve as a source of energy for the amplifier unit. When the apparatus is mounted on a steam locomotive energy may be taken from the steam turbine headlight generator. It is to be understood, however, that any suitable source of direct current of proper voltage may be used. In the drawings, the source of energy is indicated as a generator G which is capable of supplying a 32 volt direct current and whose positive and negative terminals are connected to power terminals B32 and N32, respectively, of the amplifier unit. It should be pointed out that the usual train carried headlight generator may vary greatly in its output voltage, and the amplifier unit AM is arranged for proper operation at all voltages within a range of say, 26 to 40 volts.

The tube ET is provided with a heater or filament circuit and with a plate circuit which are independently connected in multiple to the 32 volt current source. The tube ET is also provided with a control grid circuit which is coupled to the receiver through the filter F1. The heater or filament 10 is connected across terminals B32 and N32 through a resistor R3 and the tube ET is constantly heated by this filament circuit. It will be seen that biasing resistors R1 and R2 are connected in series across the power terminals B32 and N32 and are provided with a junction or intermediate terminal 20 to which the cathode 11 of the tube is connected by wire 22, so that resistor R2 is common to both the plate and grid circuits. The plate circuit can be traced from terminal B32 over lead wire 27, primary winding 25 of transformer MT, lead wire 26, plate 13 and tube space to cathode 11, wire 22, intermediate terminal 20, and resistor R2 to terminal N32.

The control grid circuit consists of two circuits in multiple, one of which can be traced from terminal 16 of grid 15, over lead wire 30, through secondary winding 9 on transformer T1, wire 31, resistor R2, intermediate terminal 20, and over lead wire 22 to cathode 11. The other control grid circuit may be traced from terminal 17, over lead wire 23, through the reactor L1, over lead wire 33, through resistor R2 to the intermediate terminal 20, and over lead wire 22 to cathode 11. It will be seen that both of the control grid circuits connect the control grid 15 to terminal N32 and that energy effective to create a negative bias on the control grid 15 may be supplied to the grid 15 over either of these circuits.

It will be seen that control grid 15 is provided with a fixed negative grid bias voltage equal to the voltage drop across resistor R2 due to biasing resistors R1 and R2 being connected across the 32 volt direct current source. The voltage drop across resistor R2 varies directly with variations of the voltage of the supply source, and resistor R2 is preselected to provide a fixed negative bias voltage that establishes a predetermined normal plate circuit current that is maintained substantially constant over a relatively wide range of variations in the output voltage of the direct current source.

The code following relay CF has its operating winding connected across the terminals of secondary winding 35 of the master transformer MT, in multiple with condenser C3. Condenser C3 serves to bypass the alternating component of the electromotive force induced in the secondary winding 35 of transformer MT, but the code variations, that is, the increase and decrease of the average value of plate circuit current in primary winding 25 of transformer MT, will induce energy in the secondary winding 35 to cause operation of relay CF. Code following relay CF is preferably a stick polar relay operable in response to a predetermined value of energization.

The grid 14 of electron tube ET is connected to the positive terminal B32 and serves as a screen grid to improve the operation of the tube, the parts being so proportioned that the tube becomes inoperative if the screen grid 14 becomes disconnected. The decoding unit and the cab signal unit, which are indicated as a whole by the labeled rectangles DU and CS, respectively, form no portion of my invention, and are illustrated and described in detail in the above referred to Patent No. 2,336,766, issued to Leslie R. Allison et al., and it is unnecessary to provide a detailed description of this portion of the equipment, except to state that the decoding unit DU operates to cause the signal CS to display its stop or most restrictive indication as long as the contact of relay CF remains in either of its two positions and causes signal CS to display a permissive indication when and only when the contact of relay CF is operated between its two positions.

In describing the operation of the apparatus, I shall first consider that the generator G supplies current at a nominal voltage of 32 volts, and that no rail current is flowing to induce an electromotive force in the receiver windings 2 and 3. Under this condition the bias voltage derived from resistor R2 for the electron tube ET effects a normal value of plate circuit current. It will be seen that if the voltage supplied by generator G changes, the voltage impressed on the plate circuit of the tube ET is changed, while the bias voltage derived from the resistor R2 correspondingly varies with the result that the plate circuit current remains at substantially the same normal value for all voltages of generator G between the aforesaid limits of 26 and 40 volts. The apparatus is arranged and constructed so that when the normal bias is maintained on the control grid 15 of the tube ET, the value of the current flowing in the circuit of the tube plate, and therefore in the primary winding of the transformer MT, is of such a small value that an intermittent opening in the plate circuit of the tube ET will not cause sufficient energy to be induced in the secondary winding of transformer MT to cause operation of the code following relay CF.

If at this time the grid bias voltage should be intermittently removed from the grid 15 of electron tube ET, it is possible that the increase in the plate circuit current through the primary winding 25 of transformer MT might be sufficient to cause operation of code following relay CF.

The arrangement of the equipment embodying my invention includes the two grid circuits connected in multiple to control grid 15, and the possibility that both circuits will become disconnected at the same time to remove the normal bias voltage is extremely remote. If either one of the circuits becomes disconnected at any point, the other circuit will continue to supply the grid bias voltage to control grid 15 of electron tube ET and thereby hold the plate current to its normal value.

I shall now assume that alternating current coded at the 180 code rate is supplied to rails 1*a* and 1*b* so that an induced electromotive force is received by inductors 2 and 3, and that this induced alternating current is supplied from the receiver R through the filter F1 to the grid circuit of electron tube ET. Each positive half cycle of this electromotive force supplied through the filter F1 to the grid 15 of electron tube ET drives the grid 15 in a positive direction in opposition to the fixed negative bias voltage derived from resistor R2, and accordingly, the flow of plate current increases at this time. Thus there is an increase in the value of the plate current during each "on" code period of the coded current, and the plate current decreases to substantially its normal value during each "off" code period. Such code variations of the value of the plate circuit current, and therefore in the current of the primary winding of transformer MT, induces electromotive forces of opposite polarity in the secondary winding 35 of transformer MT, with the result that code following relay CF is alternately energized with currents of opposite polarity and is operated at a rate corresponding to the 180 code rate of the rail current. The parts are so proportioned and arranged that the rail current creates a predetermined energization of relay CF which is equal to that required for proper operation of the relay, the relay being neither over-energized nor under-energized. Hence the relay is operated in step with the "on" and "off" code periods without creating code distortion in the energy supplied through the contact 39 of relay CF to the decoding unit DU. With the relay CF operated at a rate corresponding to the 180 code rate, the decoding equipment is operated to cause a "clear" signal indication to be displayed in the cab signal unit CS.

The operation of the apparatus when current of either the 120 or 75 code rate supplied to the rails is substantially the same as that above described for the 180 code rate, with the exception of course, that decoding unit DU responds in a different manner to provide the various indications on the cab signal unit CS, such as shown and described in the aforementioned Letters Patent No. 2,336,766, issued to Leslie R. Allison et al.

The arrangement provided by my invention insures that a broken connection in the grid circuit of the electron tube ET will be promptly detected and will not cause objectionable operation of relay CF. For purposes of illustration, I will assume that energy coded at the 180 code rate is being supplied to the track rails 1a and 1b, and that the electromotive force induced in the inductors 2 and 3 is being supplied through the filter F1 to the electron tube ET to cause operation of the code following relay CF, as described above. Since the secondary winding 9 of transformer T1 in combination with the reactor L1 and the condenser C2 constitutes a parallel resonant circuit which is tuned to the frequency of the 100 cycle alternating current supplied to the rails, it will be apparent that if any portion of the parallel resonant circuit should be interrupted, the circuit will be detuned. As a result the electromotive force supplied from receiver R through the filter F1 to the grid 15 of electron tube ET will drop below the value necessary to cause an effective increase in the plate circuit current of the tube. The parts are proportioned so that if any one of the elements comprising the resonant circuit becomes disconnected, the filter F1 will be detuned to such a degree that insufficient energy will be supplied to the control grid 15 to cause the current in the plate circuit of the tube to change sufficiently to produce operation of the relay CF and its contact 39 will remain in one position or the other.

Since the reactor L1 is coupled to the remainder of the parallel resonant circuit through the grid 15 of the tube ET by way of terminals 16 and 17 and conductors 30, 23 and 33, it will be seen that if it becomes disconnected from the grid 15 of tube ET or should the grid become broken or disconnected, reactor L1 will be removed from the resonant circuit, thereby detuning the filter, and the amplifier will not receive sufficient energy to cause relay CF to operate.

It will be apparent also that any similar failure in that portion of the parallel resonant circuit including the secondary winding 9 of transformer T1, the condenser C2, lead wires 30 and 31, and the terminal 16 of the tube will cause detuning of the parallel resonant circuit comprising the input filter F1, with the result that the grid 15 of the electron tube ET will not receive from receiver R sufficient energy to overcome the negative bias which at that time would be supplied over lead wire 33, through reactor L1, and over lead wire 23 to terminal 17 and thus to the grid 15 of electron tube ET.

Accordingly, it will be seen from the foregoing, that the integrity of both of the circuits for the control grid 15 is checked at all times, and if any of the connections in either of these circuits should become open, the input filter will be detuned from its normal resonant frequency with the result that even though coded alternating current is supplied from the receiver R to the filter F1, the energy supplied through the filter to the control grid 15 of the tube ET is insufficient to cause the tube to supply to the circuit of the primary winding of transformer MT energy effective to operate the relay CF, and its contact will remain in one position or the other. When relay CF ceases to operate the signal CS is caused to display its stop or most restrictive indication. This display of the most restrictive indication by the signal CS cannot create a hazardous condition and shows that the equipment is not functioning as intended.

In addition, it will be seen from the foregoing that when either of the circuits of the control grid 15 of the tube ET is interrupted, the bias on the grid is maintained by energy supplied over the other of these circuits with the result that the energy in the plate circuit of the tube is maintained at a value ineffective to operate relay CF. Accordingly, if either of the circuits of the control grid 15 is intermittently interrupted, the bias on the control grid will be continuously maintained and there is no danger that this intermittent interruption in a circuit of the control grid can assimilate code energy from the rails that will reduce the bias on the tube so as to cause changes in the current in the tube plate circuit which could result in operation of relay CF.

As pointed out above, if either of the circuits of the control grid 15 is intermittently interrupted, the filter F1 will be alternately tuned and detuned with respect to the 100 cycle energy supplied from the receiver. Accordingly, if at the time one of the circuits of the control grid 15 is intermittently interrupted, coded alternating current is being supplied over the track rails, the energy supplied to the control grid 15 of the tube ET will be effective to overcome the bias on this grid only in the periods in which energy is supplied over the track rails and in the periods during which the filter is tuned to its normal frequency. In the remainder of the time, that is, when the filter is detuned, and during the "off" periods of the coded energy supplied over the track rails, energy effective to overcome the bias on the control grid will not be supplied thereto.

As a result of this irregular supply of energy to the control grid 15 of the tube ET energy will be supplied over the plate circuit to transformer MT to cause operation of relay CF at irregular intervals. This erratic operation of the contact of the relay CF will cause the decoding equipment DU to cause the display of the most restrictive indication by the cab signal CS.

Accordingly, the intermittent interruption of a circuit of the control grid of the tube ET will not create a hazardous condition by causing the display of a less restrictive indication than is warranted by traffic conditions.

Referring to Fig. 2, there is shown therein a modification of the arrangement shown in Fig. 1, using tube ETA having only one connection to the control grid 15a. The details of operation of this arrangement are similar to those previously described in connection with Fig. 1, and need not be repeated. Although the arrangement shown in Fig. 2 does not check the integrity of the grid 15a of the tube, it has the advantage of checking the filter circuit so that if any of the leads 30, 31, 23 or 33 should become disconnected, or if the reactor L1 or secondary winding 9 of transformer T1 should become open, the filter will be detuned, and the equipment will not operate, while at the same time, the negative grid bias voltage will continue to be supplied to grid 15a through whichever branch of the grid circuit remains intact.

Although I have herein shown and described but two forms of coded carrier signaling apparatus embodying my invention, it is to be understood that various changes and modifications may be made therein within the scope of the appended claims without departing from the spirit and scope of my invention.

Having thus described my invention, what I claim is:

1. In combination; an electron tube having an anode, a cathode, and a control grid; and having two terminals connected to the control grid, one at each end of the grid, a grid circuit for said tube comprising an input filter having two inductive elements and a capacitive element arranged to form a parallel resonant circuit tuned for receiving energy of a preselected frequency, said grid circuit connected to said two terminals of the grid and to said cathode with one of said inductive elements having in series therewith the grid of the tube, means for supplying a bias voltage to the grid of the tube through each of said inductive elements independently of the other inductive element, and an output circuit for said tube having connections to said anode and cathode.

2. In combination; an electron tube having an anode, a cathode and at least one control electrode; said tube provided with two terminals for said control electrode one connected to each end of the electrode, an input filter comprising two inductive elements and at least one capacitive element connected in multiple to thereby form a parallel resonant circuit said filter tuned to pass energy of a preselected frequency, an output circuit including the anode and cathode of said tube and a source of voltage, a source of bias voltage, an input circuit for said tube including said input filter and connected to said cathode and to said two terminals of said control electrode in such a manner as to have one of said inductive elements in series with the control electrode of said tube, said bias voltage source connected to said control electrode and cathode through said filter to create with said output circuit voltage a preselected operative condition for said tube and filter and which condition is checked by said series arrangement of said control electrode and said one of the inductive elements of said filter.

3. In an electron tube amplifier for amplifying energy of a preselected frequency only, in combination, an input filter having two inductive elements and at least one capacitive element connected in multiple to form a filter resonant at said preselected frequency, an output circuit for said amplifier, an electron tube having an anode, a cathode, and a control grid, and having two terminals connected to the control grid, one at each end of the grid, a source of bias voltage, a grid circuit for said tube including said bias voltage source and said input filter, an anode circuit for said tube coupled to said output circuit, said grid circuit connected to said two terminals of said control electrode and to said cathode for said input filter to have one of said inductive elements connected thereto by a circuit having the control grid of said tube in series therewith, and the other inductive element of said filter being disposed to receive energy of said preselected frequency.

4. In a coded signaling system having a code following relay operated by energy supplied through an electron tube having a control grid to which control energy is supplied through an input filter having inductive and capacitive elements and which is resonant to energy of a selected frequency, the combination with the foregoing of improved means for maintaining a biasing voltage on said control grid, said means comprising two independent connections between a source of biasing voltage and said control grid and each including in series therewith an inductive element of said filter so that interruption of either one of said two connections over which energy for biasing said control grid is supplied renders the filter non-resonant to energy of said selected frequency while the bias on the tube is maintained by energy supplied over the other one of said circuits.

5. In combination; an electron tube having an anode, a cathode and a control grid; an anode circuit connected across said anode and cathode and including a source of current effective to cause substantial flow of current in said anode circuit unless said control grid is maintained at a negative potential with respect to said cathode, a filter including circuits having a capacitance element and a first and a second inductance element and proportioned to be resonant to energy of a selected frequency when and only when the circuits of both of said inductances are complete, a circuit including a bias voltage source connected to said control grid through said first inductance element, a circuit including said bias voltage source connected to said control grid through said second inductance element, means for at times supplying energy of said selected frequency to said filter to thereby cause energy to be supplied through said filter to said control grid to counteract said grid bias and permit energy to flow in said anode circuit, and means responsive to flow of energy in said anode circuit.

6. In combination, an electron tube having an anode, a cathode and a control electrode; an anode circuit including a current source connected to said anode and cathode, a code responsive means coupled to said anode circuit, a control circuit including two impedances in multiple connected to said control electrode and cathode to form two independent circuit paths between the control electrode and cathode each of which paths includes an individual one of said impedances, a source of coded energy coupled to said control circuit to operate said code responsive means due to the amplifying action of said tube, and a source of bias voltage connected to said control circuit to be common to said circuit paths to maintain a given bias voltage for the control grid and avoid false operation of said code responsive means due to an intermittent opening and closing of said control circuit.

7. In combination, an electron tube having an anode, a cathode and a control electrode; said tube provided with two terminals for said control electrode one connected to each end of the electrode, an anode circuit connected to said anode and cathode, a code responsive means coupled to said anode circuit, a bias voltage source, a control circuit including impedance elements and said bias voltage source connected to said control electrode and cathode to bias the control electrode at a given potential with respect to said cathode, a source of coded energy coupled at times to said control circuit to operate said code responsive means due to the amplifying action of the tube, said control circuit being connected to form two parallel circuit paths one between one of said two terminals of the control electrode and the cathode and the other between the other one of said two terminals and the cathode, and each of said circuit paths including an individual one of said impedances and said bias voltage source to avoid false operations of said code responsive means due to an intermittent opening and closing of said control circuit.

8. In combination, an electron tube having an anode, a cathode and a control electrode; said tube provided with two terminals for said control electrode one connected to each end of the electrode, an anode circuit including a current source connected to said anode and cathode, a control circuit including inductance and capacitance tuned to resonance at a given frequency and connected to said control electrode and cathode, a source of energy of said given frequency coupled at times to said control circuit to amplify such energy in said anode circuit, and said connections of said control circuit to said control electrode being to said two terminals thereof in such a manner as to include the control electrode as a series circuit element of the control circuit, whereby a break of the control electrode detunes the control circuit and renders the combination ineffective to amplify said energy.

9. In combination, an electron tube having an anode, a cathode and a control electrode; said tube provided with two terminals for said control electrode one connected to each end of the electrode, an anode circuit including a current source connected to said anode and said cathode, a code responsive means coupled to said anode circuit, a bias voltage source, a control circuit including inductance and capacitance elements tuned to resonance at a given frequency, said control circuit and said bias voltage source connected to said control electrode and cathode to bias the control electrode at a given potential with respect to said cathode, a source of coded energy of said given frequency coupled at times to said control circuit to operate said code responsive means, and said connections of said control circuit to said control electrode including said two terminals thereof in such a manner that said given bias potential of the control electrode is maintained and false operation of said code responsive means avoided when an intermittent opening and closing of the control circuit occurs.

10. In combination, an electron tube having an anode, a cathode and a control grid; said tube provided with two terminals for its control grid one connected to each end of the grid, an anode circuit including a current source connected to said anode and cathode, a filter including a winding, a capacitor and a reactor connected in multiple and tuned to resonance at a given frequency, a grid circuit including said filter and a source of bias voltage connected to said control grid and cathode, said winding and source of bias voltage interposed between the cathode and a given one of said two terminals and said reactor and source of bias voltage disposed between the cathode and the other one of said two terminals, whereby said bias voltage is applied to said grid through two independent paths and said control grid is a circuit element of said filter, and an input circuit including a source of signaling voltage of said given frequency effectively coupled at times to said winding to amplify the signaling voltage in said anode circuit.

11. In combination, an electron tube having an anode, a cathode and a control grid and having two terminals connected to the control grid one at each end of the grid, a direct current power source, an anode circuit including said power source connected to said anode and cathode, a filter, a grid circuit including said filter having connections to said control grid and to said cathode, a bias means including a resistor connected across said power source and having an intermediate terminal to which said grid circuit is connected to provide said tube with a grid bias voltage, said filter comprising an inductive section and a capacitive section which are connected in multiple and tuned to resonance at a preselected frequency, said filter having at least a portion of its inductive section connected to its capacitive section by a circuit path having said control grid in series therewith due to being connected to said two terminals, an input circuit including a source of control current of said preselected frequency coupled to said filter to reproduce said preselected frequency in said anode circuit, and whereby a break in said control grid causes detuning of the filter to thereby render the combination inoperable.

CARL VOLZ.

REFERENCES CITED

The following references are of record in the file of this patent:

UNITED STATES PATENTS

| Number | Name | Date |
|---|---|---|
| 2,063,196 | Schlesinger | Dec. 8, 1936 |
| 2,200,188 | Nicholson | May 7, 1940 |
| 2,250,191 | Crooks | July 22, 1941 |
| 2,266,096 | Timmer | Dec. 16, 1941 |
| 2,270,791 | Strutt et al. | Jan. 20, 1942 |